United States Patent [19]

Tuusa

[11] Patent Number: 5,031,087
[45] Date of Patent: Jul. 9, 1991

[54] PROCEDURE FOR THE SELECTION OF A BRIDGE OR BRIDGE SECTION IN A RECTIFIER BRIDGE UNIT, AND A BRIDGE SELECTOR UNIT DESIGNED FOR IMPLEMENTING THE PROCEDURE

[75] Inventor: Heikki Tuusa, Tampere, Finland

[73] Assignee: Kone Elevator GmbH, Baar, Switzerland

[21] Appl. No.: 460,685

[22] Filed: Jan. 4, 1990

[30] Foreign Application Priority Data

Mar. 6, 1989 [FI] Finland .................................. 891059

[51] Int. Cl.$^5$ .............................................. H02M 7/23
[52] U.S. Cl. ........:................................ 363/63; 363/70; 363/89; 363/127
[58] Field of Search ...................... 363/63, 67, 69, 70, 363/84, 89, 125, 127

[56] References Cited

U.S. PATENT DOCUMENTS

| | | | |
|---|---|---|---|
| 4,362,976 | 12/1982 | Fujioka et al. ........................ | 363/63 |
| 4,393,442 | 7/1983 | Kähkipuro ............................ | 363/63 |
| 4,399,499 | 8/1983 | Butcher et al. ...................... | 363/127 |
| 4,473,757 | 9/1984 | Farago et al. ...:................... | 363/127 |
| 4,730,242 | 3/1988 | Divan .................................. | 363/127 |
| 4,882,664 | 11/1989 | Pennington ........................ | 363/127 |

*Primary Examiner*—Peter S. Wong
*Attorney, Agent, or Firm*—Sughrue, Mion, Zinn, Macpeak and Seas

[57] ABSTRACT

In a procedure for the selection of a bridge or bridge section in a rectifier bridge unit having a bridge or bridge section conducting in one direction and another bridge or bridge section conducting in the other direction, said bridges or bridge sections having solid-state switches, selection of the bridge or bridge section is based on the direction of the actual value of the current when the actual current has an essentially non-zero value, on the reference value of the current when the actual current value is essentially zero and the reference value of the current is essentially other than zero, or, when both the actual and reference values of the current are essentially zero, on a signal controlling the selection of the bridge or bridge section during the zero-current condition, which signal directs the bridge control signals alternatively to either bridge or bridge section. A bridge selector unit includes circuits for implementing this procedure.

12 Claims, 3 Drawing Sheets

5,031,087

PROCEDURE FOR THE SELECTION OF A BRIDGE OR BRIDGE SECTION IN A RECTIFIER BRIDGE UNIT, AND A BRIDGE SELECTOR UNIT DESIGNED FOR IMPLEMENTING THE PROCEDURE

BACKGROUND OF THE INVENTION

1. Field Of The Invention

The present invention relates to a procedure for the selection of a bridge or bridge section in a rectifier bridge unit comprising a bridge or bridge section conducting a load current in one direction and another bridge or bridge section conducting a load current in the other direction, said bridges or bridge sections consisting at least of solid-state switches, and to a bridge selector unit designed for implementing the procedure.

2. Description of Related Prior Art

The logic circuits currently used for bridge selection in thyristor rectifiers are too complex. Moreover, they involve unduly long pauses about the bridge change point.

SUMMARY OF THE INVENTION

The object of the present invention is to reduce the aforementioned drawbacks.

According to one aspect of the invention there is provided a procedure for the selection of a bridge or bridge section in a rectifier bridge unit wherein the selection is based on the direction of the actual current when the actual current has an essentially non-zero value; on a reference current when the actual current value is essentially zero and the reference value of the current is essentially other than zero, or, when both the actual and reference values of the current are essentially zero, on a signal controlling the selection of the bridge or bridge section during the zero-current condition, which signal directs the bridge control signals alternately to either bridge or bridge section.

The selection logic of the invention enables the operating delay about bridge change to be considerably reduced.

BRIEF DESCRIPTION OF THE DRAWINGS

An embodiment of the invention will now be described by way of example only and with reference to the accompanying drawings, in which.

DESCRIPTION OF PREFERRED EMBODIMENTS

Figure 1:
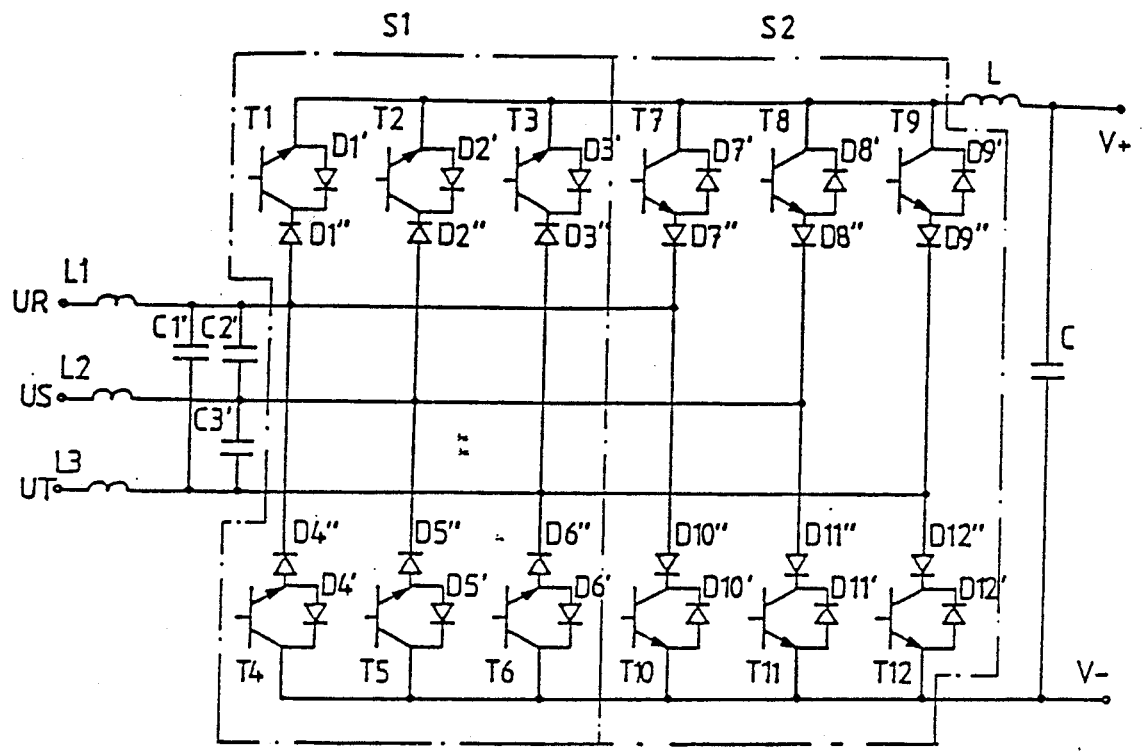
FIG. 1 illustrates a conventional four-quadrant rectifier bridge unit.

FIG. 1 shows the main circuit of a four-quadrant rectifier unit using fully gate-controlled switching components (GTO, transistor, FET, IGBT, SIT, etc.). The three-phase mains supply, in which the phase voltages are UR, US and UT, is connected to the two bridges S1 and S2 of the rectifier. Coils L1–L3 and L and capacitors C1'–C3' and C are filtering components. The first bridge S1, which conducts in the direction from the mains to the d.c. circuit V+ and pole to the load, consists of transistors T1–T6, diodes D1'–D6' connected in inverse-parallel with the transistors T1–T6, and auxiliary diodes D1''–D6'' connected in series with the transistor-diode modules. These auxiliary diodes ensure that the operation of the bridge is not affected by the internal diodes of the modules. Similarly, the second bridge, which conducts in the direction from the d.c. circuit to the mains, consists of transistors T7–T12, diodes D7'–D12' and auxiliary diodes D7''–D12''. The four-quadrant construction in this context means that for both directions of the direct current, the voltage in the d.c. circuit may be positive or negative, i.e. power may flow either from the mains to the load or from the load to the mains.

Figure 2:
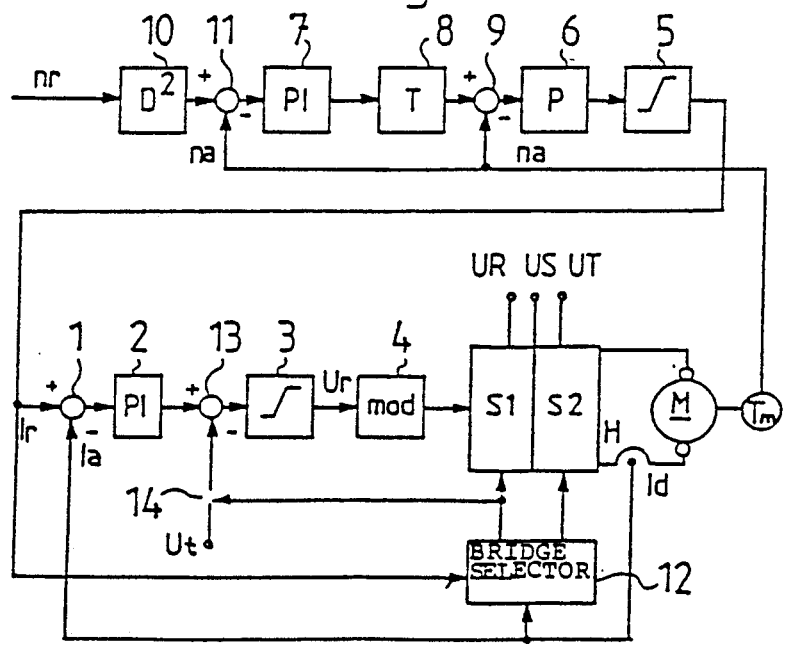
FIG. 2 illustrates a block diagram of a d.c. motor drive comprising a current regulator circuit.

It is assumed that the drive to which the bridges belong has a normal current regulation system, e.g. like that shown in FIG. 2. The innermost control loop in this system comprises control of the motor current and of the torque, which is proportional to the current. The motor current Id is measured by a bi-directional Hall sensor H. The measured current Ia is compared by a differential circuit 1 to a set current value Ir (reference current) given by the speed controller, whereupon the difference signal is passed to a PI-type current regulator 2. The output of the current regulator is limited by a limiting circuit 3, which determines the modulation index Ur (reference voltage) of the modulator circuit 4, i.e. the d.c. output voltage of the bridge.

When considering the action of the speed controller, it is assumed that the current regulator is correctly tuned and that the motor M has a large inertial mass. Under these circumstances, the current control loop and the motor M can be regarded as being substituted by a single integrating device. In this way it can be treated as a system having a single time constant, allowing it to be more easily controlled by the first speed feedback signal via the differential circuit 9 and by a P-controller 6.

The PI-type speed controller 7 is so tuned that it compensates the time constant in question and that the remaining closed system comprised by the time constant T (in unit 8) filtering the voltage of the tachometer Tm is critically tuned. The remaining two time constants of the system can be compensated by using a circuit ($D^2$) 10 emphasizing the reference value nr. The difference between the actual value na and the reference value nr is produced by a differential circuit 11.

The bridge selector unit 12 utilizes the actual current value Ia and the reference value Ir obtained from the system. The principle of the selection logic is presented in FIG. 3. Depending on the magnitude of the actual and reference values of the direct current Id, the logic directs the switching component control pulses R+, R−, S+, S−, T+ and T− obtained from the pulse width modulator 15, constructed e.g. as shown in FIG. 4, either to the transistors T1–T6 of bridge S1 or to the transistors T7–T12 of bridge S2.

The direct current flowing through the load becomes intermittent when its magnitude falls below a certain value. This reduces the gain of the system and the voltage reference is decreased to a level below that required by the load balance voltage. The unbalanced condition may give rise to a large current pulse at the moment of bridge change. For this reason, in the bridge change situation, a differential circuit 13 alters the voltage reference in the safe direction in a stepwise manner by applying a further reference Ut obtained via switch 14.

The bridge selector unit comprises comparator circuits 16 and 17 for the actual and reference values Ia and Ir, and an oscillator 18. In addition, the unit has AND-gates 19 and 20, an OR-gate 21 and a selector switch 22 for the amplifier units 23 and 24 amplifying the control pulses.

Figure 4:
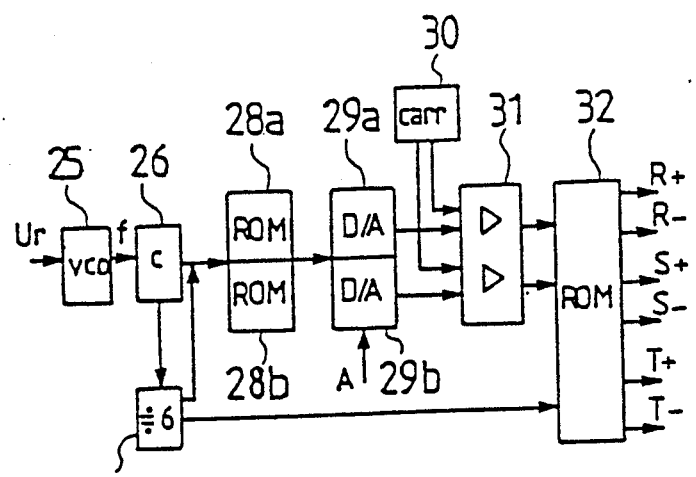
FIG. 4 illustrates the block diagram of the modulator circuit.

The modulator circuit shown in FIG. 4 has two EPROMs 28a and 28b which contain the 120° intervals consisting of the rising and falling edges of a sine wave. These are read with a 60° phase shift. The rate at which the modulation references are read, and therefore the frequency of the phase currents, is determined by a voltage-controlled oscillator (VCO) 25. The modulation references are converted into analog form by D/A converters 29a and 29b provided with amplitude adjustment A, and the preliminary modulation pulses are generated by a comparator 31 which compares these references to corresponding carrier waves obtained from unit 30. A 6-divider 27 provides the information indicating which one of the six 60° modulation intervals is being treated. This three-bit information is used together with the outputs of the comparator unit 31 as address data in an EPROM 32 which contains control data corresponding to all combinations of states for the control of the switching components of the bridge.

Figure 3:
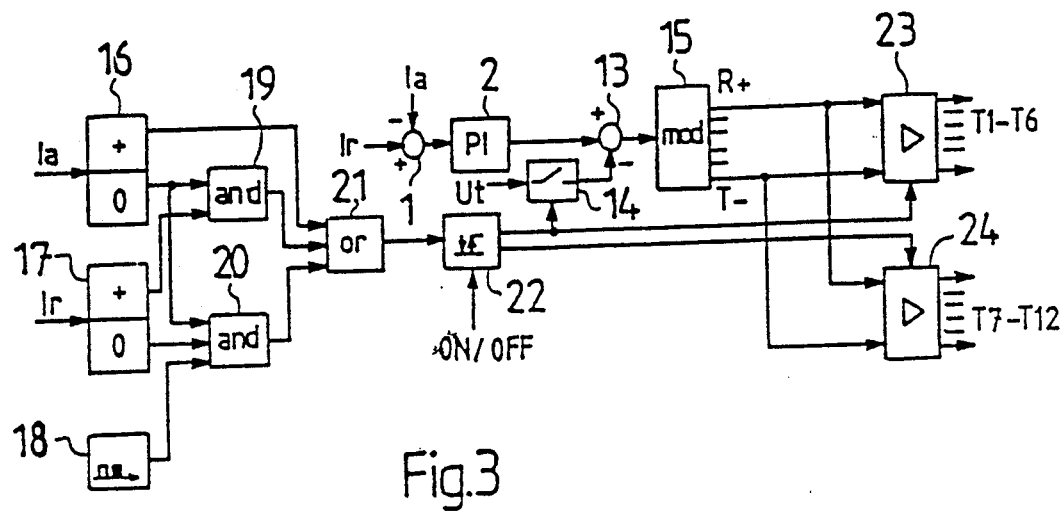
FIG. 3 illustrates the block diagram of the bridge selection circuit of an embodiment of the present invention.

In FIG. 3, the modulation pulses are directed to the transistors corresponding to bridge S1 if a) the measured d.c. direction is positive (Ia= +), or if b) the actual current value is zero but the reference value is positive (Ia=0 & Ir= +), or if c) both the actual and reference values of the current are zero but the output of the oscillator circuit 18 is active (Ia=0 & Ir=0 & Osc=1).

In all other cases the modulation pulses are directed to the transistors corresponding to bridge S2. The selection of the bridge is based on the following considerations:

a) In bridge S1, the current can only flow through in the positive direction (in the forward direction of the switches), i.e. from the positive rail V+ to the load and back, and through bridge S2 in the opposite direction. In other words, the bridge selected must be the one for which the direction of the current flow at the moment is the forward direction.

b) If the actual current value is zero, either bridge can be selected without any major voltage transients being generated by the bridge change. Therefore, in the zero-current situation, the logic always selects the one of the bridges which corresponds to the momentary direction of the reference value of the current, i.e. the direction in which the current regulator will direct the current next.

c) When both the actual and reference values of the current are zero, the oscillator circuit 18 alternately selects one of the bridges S1 and S2. Repeated bridge changes in the zero-current situation are employed in order to prevent the output of the integrator of the current regulator from drifting in any direction. If a drift has occurred, the current regulation system returns the integrator output to the value required by zero current at the moment of bridge change. Changing the bridges continuously also ensures that a small current will flow in the d.c. circuit, ensuring that the current path in the main circuit is shut off. The required oscillator frequency depends on the tuning and drift rate of the regulator.

Figure 5:
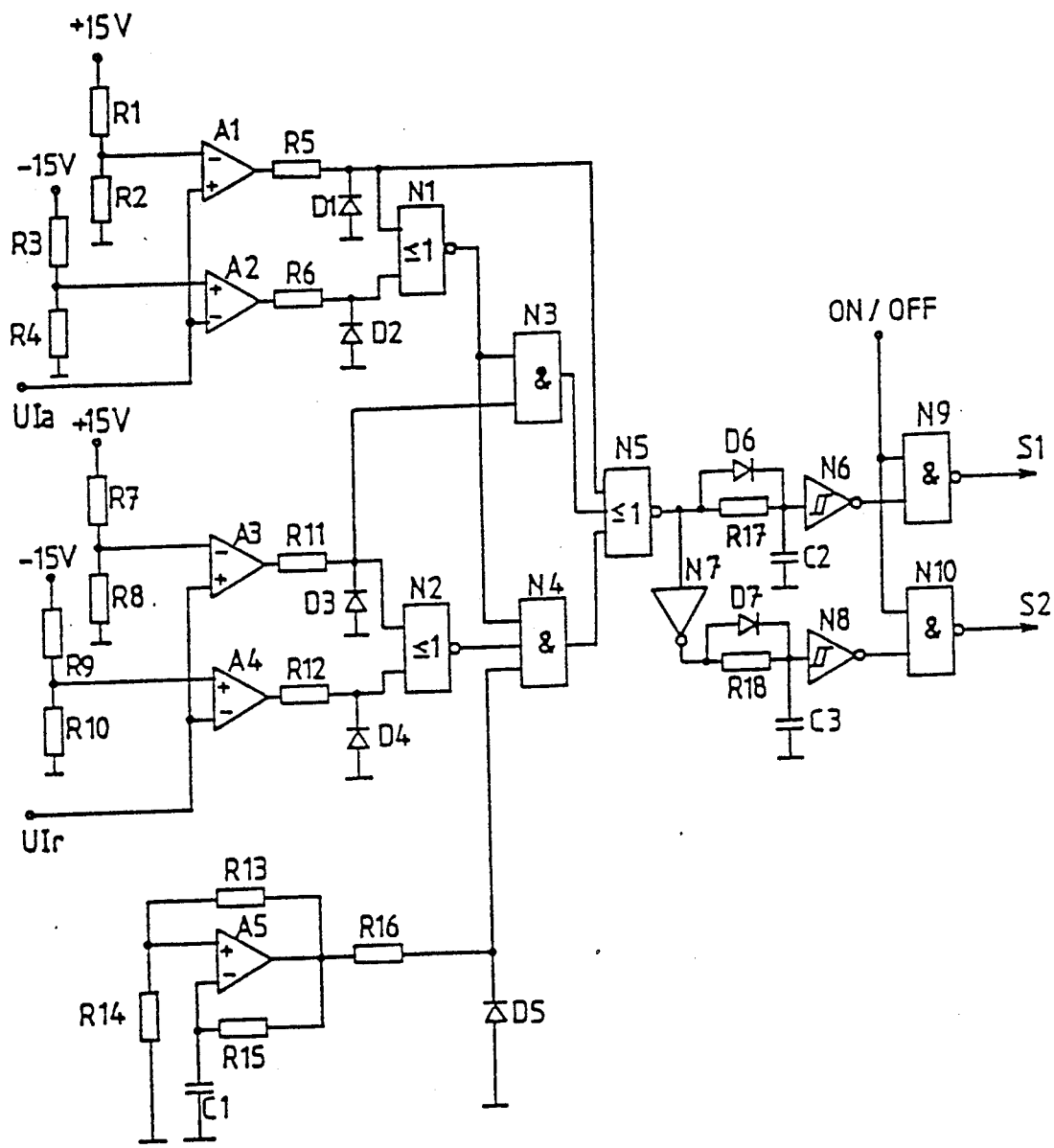
FIG. 5 shows an electrical shematic of the bridge selector unit of an embodiment of the present invention.

The bridge selection logic can be implemented using e.g. a circuit like that shown in FIG. 5. In this circuit, a voltage UIa proportional to the actual value of the actual current is compared to voltages corresponding to the positive and negative zero-current levels, the latter voltages being produced by means of comparators A1 and A2 and resistors R1-R4. If the actual current value is between these reference levels (Ia=0), the output of the NOR-gate N1 is high. If the actual current value is positive (Ia= +), i.e. higher than the positive reference voltage, then also the output of the comparator A1 is in the high state. In exactly the same way, a voltage UIr proportional to the reference current is compared to zero-current levels produced by means of comparators A3 and A4 and resistors R7-R10. The output of the NOR-gate N2 is high if the set value is between the zero-current levels (Ir=0), and the output of the comparator A3 is high if the set value of the current is positive (Ir= +). The oscillator required by the logic consists of amplifier A5, resistors R13 -R15 and capacitor C1. The resistor-diode pairs R5-D1, R6-D2, R11-D3, R12-D4 and R16-D5 serve to adapt the voltages to levels acceptable to the gate circuits, i.e. to stop the passage of negative voltages.

The output of NAND-gate N3 is high if the value the actual current is zero and the value of reference current is positive. The output of gate N4 is high if both the actual and set values of the current are zero and the output of the oscillator circuit is high. NOR-gate N5 combines the conditions on which the bridge is activated: If the set value of the current is positive (output of A1 high) or the output of gate N3 or gate N4 is high, then the output of gate N5 is low. In all other cases the output of gate N5 is high.

If the output of gate N5 goes low, then the corresponding input of NAND-gate N9 will only go high after a delay determined by the RC-circuit R17-C2 and Schmitt trigger N6. If the output of N5 goes high, by virtue of the diode connected in parallel with resistor R17, the signal is passed through without delay. If the external control line ON/OFF is high, the output of NAND-gate N9 goes low and the modulation pulses are directed to the switching components of bridge S1.

When the output of gate N5 goes high, the output of inverter N7 goes low and, as before, the output of gate N10, connected after resistor R18, diode D7, capacitor C3 and Schmitt trigger N8, will only go low after a slight delay and the modulation pulses are directed to bridge S2 if the external control line is high.

In other words, when the output of gate N5 is low, the modulation pulses are directed to bridge S1, and when it is high, to bridge S2 if allowed by the external control line. In the bridge change situation, the modulation pulses are withheld from both bridges during a time determined by the delay circuit to make sure that the components of the bridge which was conducting before the change are turned off before the other bridge is activated.

It will be obvious to a person skilled in the art that embodiments of the invention are not restricted to the examples described above, but that they may instead be varied within the scope of the following claims.

I claim:

1. A procedure for the selection of a bridge in a rectifier bridge unit with solid state switches comprising a load, a d.c. load circuit, a first bridge for conducting a d.c. load current in one direction and a second bridge for conducting a d.c. load current in the opposite direction, said procedure including:
a) detecting the direction and value of an actual current in said d.c. load circuit;
b) detecting the direction and value of a reference current produced by said d.c. load circuit;
c) selecting said first or said second bridge according to a signal controlling the selection of the bridge dependent on the direction of said actual current when said actual current has an essentially non-zero value and on the direction of said reference current when the value of said actual current is essentially zero and the value of said reference current is essentially other than zero; or, a signal controlling the selection of the bridge during the zero-current condition when the values of both said actual and reference currents are essentially zero, so that the first and second bridges are selected alternately.

2. A procedure as claimed in claim 1, wherein said signal controlling the selection of a bridge during the zero-current condition is a pulse-shaped signal of constant frequency, and one level of said pulse shaped signal directs a control signal to the first bridge and the other level directs said control signal to the second bridge.

3. A procedure as claimed in claim 2, wherein a voltage reference produced from the difference between the values of said actual and reference currents and used for the generation of the control signal for the solid-state switches, is altered in a stepwise manner in the bridge change situation by applying an additional reference signal.

4. A procedure as claimed in claim 1, wherein a voltage reference produced from the difference between the values of said actual and reference currents and used for the generation of the control signal for the solid-state switches, is altered in a stepwise manner in the bridge change situation by applying an additional reference signal.

5. A procedure as claimed in claim 1, wherein when the direction of said actual or said reference current is from a positive terminal of the d.c. load circuit to the load, the first bridge is selected, and, when the direction of said actual or said reference current is from a negative terminal of the d.c. load circuit to the load, the second bridge is selected.

6. A procedure as claimed in claim 5, wherein a voltage reference produced from the difference between the values of said actual and reference currents and used for the generation of the control signal for the solid-state switches, is altered in a stepwise manner in the bridge change situation by applying an additional reference signal.

7. A bridge selector unit for the selection of a bridge in a rectifier bridge unit with solid state switches comprising a load, a d.c. load circuit, a first bridge for conducting a d.c. load current in one direction and a second bridge for conducting the d.c. load current in the opposite direction, said bridge selector unit comprising:
comparator means for detecting the direction and the value of an actual and a reference current;
logic means for generating a signal controlling the selection of the bridge;
delay and control means for conditioning said signal controlling the selection of the bridge according to the actual state of said solid state switches; and
means for generating a signal controlling the selection of the bridge during the zero current condition.

8. A bridge selection unit as claimed in claim 7, wherein said means for generating a signal controlling the selection of the bridge during the zero-current condition, comprises an oscillator for producing a pulse-shaped signal of constant frequency, one level of said signal directing a control signal to the first bridge and the other level directing said control signal to the second bridge.

9. A bridge selector unit as claimed in claim 7, wherein said comparator means comprises comparator circuits for comparing a signal proportional to the value of said actual current and a signal proportional to the value of said reference current to a positive and a negative zero-current reference levels.

10. A bridge selector unit as claimed in claim 7, wherein said logic means for generating said signal controlling the selection of the bridge comprises:
a first pair of gate circuits producing a logic signal that indicates the presence of a zero-current condition; a second pair of gate circuits, a first gate of which produces a logic signal dependent on the values of said actual and reference currents while a second gate produces a logic signal which depends on the values of said actual and reference currents and on an oscillator signal; and a third gate circuit for generating said signal controlling the selection of the bridge.

11. A bridge selector unit as claimed in claim 7, wherein said delay means comprises delay circuits for delaying said signal controlling the selection of the bridge whenever the bridge solid state switches are turned on and circuits for inhibiting the action of said delay circuits whenever the bridge solid state switches are turned off.

12. A bridge selector unit as claimed in claim 7, wherein said control means comprises gate circuits for conditioning said signal controlling the selection of the bridge with an external control signal.

* * * * *